UNITED STATES PATENT OFFICE.

CARLETON ELLIS, OF MONTCLAIR, NEW JERSEY, ASSIGNOR, BY MESNE ASSIGNMENTS, TO NATIONAL CARBON COMPANY, INC., OF LONG ISLAND CITY, NEW YORK, A CORPORATION OF NEW YORK.

VOLUME-STABLE MANGANESE DEPOLARIZING MATERIAL.

1,272,405.      Specification of Letters Patent.      Patented July 16, 1918.

No Drawing.      Application filed October 23, 1915. Serial No. 57,434.

*To all whom it may concern:*

Be it known that I, CARLETON ELLIS, a citizen of the United States, and a resident of Montclair, in the county of Essex and State of New Jersey, have invented certain new and useful Improvements in Volume-Stable Manganese Depolarizing Material, of which the following is a specification.

This invention relates to depolarizers adapted for use in batteries of the Leclanché type and is especially suited for dry cell purposes, particularly the miniature form of dry battery.

The invention is particularly concerned with depolarizers containing a manganese dioxid depolarizer which is non-hydrating and which does not expand to any extent in the presence of water. Some forms of artificial manganese dioxid when exposed to moisture take up more or less water forming products of a bulky nature with consequent expansion of the mass and rupture of the depolarizing agent. A lower hydrate of manganese mixed with graphite forming a depolarizing mass which is molded into the desired shape may thus rupture while the battery is in operation or standing unused on the shelves, due to such local hydration and expansion; with consequent destruction of the cell.

Anhydrous products act in a similar manner in some cases.

According to the present invention the artificial manganese dioxid used is of a substantially non-hydrating character substantially free from any tendency to expand in the presence of moisture. It may be prepared, for example, by sintering a normal oxid in an atmosphere of oxygen or one rich in oxygen at a point about that where the oxygen is expelled from manganese dioxid when heated in ordinary air. A sintering temperature of about 400-500° C. is usually satisfactory. By this sintering a contraction of the particles occurs which increases the density of the product, but not to such an extent as to convert it into such resistant bodies as mineral manganese dioxid of the pyrolusite type but leaving a fairly reactive material which is suitable for use in miniature dry batteries subject to extreme service conditions, such as rough handling. The material is not open to the objection of expansion mentioned above.

With this material it is possible to fill the voids of the depolarizing mass without danger of rupture, while heretofore in many cases the depolarizing material has been made up of a very porous open nature in order to allow room for such expansion. Useful space is thus lost which in the present case is utilized by the depolarizing compound.

The voids in the depolarizing compound are filled by screening the manganese dioxid into several sizes and mixing together with graphite such proportions of these various grades that the voids made by packing the larger particles of manganese would be filled with the smaller particles and the voids remaining after this filling should be filled with a still finer grade until substantially all the sizable voids are filled.

Such manganese dioxid may be used alone or in admixture with other forms of manganese dioxid or manganites. The depolarizing mass or mixture usually contains a suitable amount of graphite or other carbonaceous material to furnish the requisite conductivity and is preferably molded into a cylindrical form about a cylinder of carbon which serves as an electrode and is used in a zinc container with an exciting fluid ordinarily containing ammonium chlorid.

The application as a depolarizer of a non-expanding artificial manganese dioxid of this character likewise comprises manganites and other forms of manganese depolarizing material of an analogous character.

What I claim is:—

1. The process of making a depolarizing compound adapted for dry batteries of the Leclanché type which comprises heating a normal dioxid in an atmosphere of oxygen to a sintering temperature.

2. The process of making a depolarizer which comprises sintering a normal dioxid without substantial loss of its oxygen content.

3. The process of making a depolarizer which comprises heating a higher oxid of manganese substantially without substantial loss of oxygen to effect contraction of said higher oxid.

CARLETON ELLIS.